United States Patent
Meissner et al.

(10) Patent No.: US 9,664,502 B2
(45) Date of Patent: May 30, 2017

(54) INTERFERENTIAL POSITION-MEASURING DEVICE AND METHOD FOR OPERATING AN INTERFERENTIAL POSITION-MEASURING DEVICE

(71) Applicant: DR. JOHANNES HEIDENHAIN GMBH, Traunreut (DE)

(72) Inventors: Markus Meissner, Uebersee (DE); Joerg Drescher, Samerberg (DE); Wolfgang Holzapfel, Obing (DE)

(73) Assignee: DR. JOHANNES HEIDENHAIN GMBH, Traunreut (DE)

( * ) Notice: Subject to any disclaimer, the term of this patent is extended or adjusted under 35 U.S.C. 154(b) by 0 days.

(21) Appl. No.: 14/729,136

(22) Filed: Jun. 3, 2015

(65) Prior Publication Data
US 2015/0354937 A1  Dec. 10, 2015

(30) Foreign Application Priority Data
Jun. 5, 2014  (DE) .................. 10 2014 210 706

(51) Int. Cl.
*G01B 11/02* (2006.01)
*G01B 9/02* (2006.01)
(Continued)

(52) U.S. Cl.
CPC ..... *G01B 9/02083* (2013.01); *G01B 9/02049* (2013.01); *G01B 9/02055* (2013.01); *G01D 5/35306* (2013.01); *G01D 5/36* (2013.01)

(58) Field of Classification Search
CPC ............ G01B 9/02083; G01B 9/02049; G01B 9/02055; G01B 11/026; G01B 2290/45;
(Continued)

(56) References Cited

U.S. PATENT DOCUMENTS 5,195,162 A * 3/1993 Sultan .................. G01D 5/268
  356/614
6,977,368 B2  12/2005 Drescher et al.
(Continued)

FOREIGN PATENT DOCUMENTS

EP  1334332 B1  8/2003

OTHER PUBLICATIONS

F.M. Dickey, et al. "Laser Beam Shaping Applications, VII. Laser Array and Modulator Array Systems", Marcel Dekker, Inc., Dec. 2005, pp. 94-98.

*Primary Examiner* — Tarifur Chowdhury
*Assistant Examiner* — Jonathon Cook
(74) *Attorney, Agent, or Firm* — Leydig, Voit & Mayer, Ltd.

(57) ABSTRACT

An interferential position-measuring device determines a position of an object which is disposed to be movable along a measurement direction. A light source is configured to emit a beam which is split into two sub-beams. One of the sub-beams impinges on an optical functional element on the object. The sub-beams are subsequently superimposed and interfered at a superposition location and a resulting signal beam propagates toward an evaluation unit configured to generate a position-dependent measurement signal from the resulting signal beam. A switching element is disposed in the signal path downstream of the superposition location and upstream of a signal-digitizing device. The switching element is configured to define a specific sampling point in time.

19 Claims, 4 Drawing Sheets (51) Int. Cl.
*G01D 5/36* (2006.01)
*G01D 5/353* (2006.01)

(58) Field of Classification Search
CPC ... G01D 5/36; G01D 5/266; G01D 5/38; G01D 5/347; G01D 5/34715; G01D 5/34746; G03F 7/70775; H04J 14/0212; H04J 14/0033
USPC .......................... 356/482, 486, 498, 499, 616
See application file for complete search history.

(56) References Cited

U.S. PATENT DOCUMENTS

| | | | | |
|---|---|---|---|---|
| 2004/0071383 | A1* | 4/2004 | Balachandran | G01D 5/35303 385/12 |
| 2007/0058173 | A1* | 3/2007 | Holzapfel | G01D 5/38 356/499 |
| 2007/0180725 | A1* | 8/2007 | Drescher | G01B 11/002 33/707 |
| 2007/0285669 | A1* | 12/2007 | Ajgaonkar | A61B 5/0059 356/482 |
| 2011/0057092 | A1* | 3/2011 | Hane | G01D 5/244 250/231.11 |
| 2011/0255095 | A1* | 10/2011 | Jiang | G01B 9/02004 356/479 |
| 2013/0265583 | A1* | 10/2013 | Mansell | G01B 9/02028 356/482 |

* cited by examiner

INTERFERENTIAL POSITION-MEASURING DEVICE AND METHOD FOR OPERATING AN INTERFERENTIAL POSITION-MEASURING DEVICE

CROSS-REFERENCE TO PRIOR APPLICATION

Priority is claimed to German Patent Application No. DE 10 2014 210 706.7, filed on Jun. 5, 2014, the entire disclosure of which is hereby incorporated by reference herein.

FIELD

The present invention relates to an interferential position-measuring device suitable for determining with high accuracy the relative position of two objects that are movable relative to one another, and to a method for operating such a position-measuring device.

BACKGROUND

Highly accurate position measuring devices are used for sensing the position of moving objects in a wide variety of machines, such as, for example, machine tools or semiconductor fabrication machines. In particular in the last-mentioned systems, the traversing speeds of the machine components to be positioned relative to each other are becoming increasingly higher, which places correspondingly high demands on the position determination. In some cases, positioning accuracies in the range of a few nanometers are required.

In such machines, it is typically required to perform position determination along a plurality of measurement axes as simultaneously as possible to thereby, for example, determine the position of a moving object in a plurality of spatial degrees of freedom. If position sensing takes place at different points in time in the different measurement axes, this causes errors in the determination of the spatial position of object. For example, at the high traversing speeds encountered, temporal variations in the range of a few nanoseconds in the sensing of positions on a plurality of measurement axes may result in position errors on the order of several nanometers. Such shifts in the position-sensing points in time will hereinafter be also referred to as sampling jitter.

In order to overcome this problem, it is known from EP 1 334 332 B1 to avoid the resulting sampling jitter by generating, in response to a request signal from a machine control unit, a light pulse with which the measuring standard used in an optical position-measuring device is scanned. The point in time of position determination is then precisely defined via the generated light pulse. In this publication, the position-measuring device used is a grating-based optical position-measuring device, and the scanning may be performed using both imaging and interferential scanning methods. Suitable for high-accuracy measurements are, in particular, the aforementioned interferential position-measuring devices, and it is generally also possible to use purely interferometric variants besides the grating-based variants. In such interferential position-measuring devices, a beam emitted by a light source is split into at least two sub-beams, at least one of which impinges on a suitable functional element on the object one or more times. In the case of the grating-based variant, the functional element is a measuring standard; in the case of an interferometric variant, it is a reflector mirror or a retroreflector. Subsequently, the sub-beams are superimposed and interfered at a superposition location and then propagate as at least one resulting signal beam toward an evaluation unit, which generates at least one position-dependent measurement signal from the signal beam.

SUMMARY

In an embodiment, the present invention provides an interferential position-measuring device for determining a position of an object which is disposed to be movable along at least one measurement direction. A light source is configured to emit a beam which is split into at least two sub-beams. At least one of the sub-beams impinges on one or more optical functional elements on the object. The sub-beams are subsequently superimposed and interfered at a superposition location and at least one resulting signal beam propagates toward an evaluation unit configured to generate at least one position-dependent measurement signal from the at least one resulting signal beam. At least one switching element is disposed in the signal path downstream of the superposition location and upstream of a signal-digitizing device. The at least one switching element is configured to define a specific sampling point in time.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

In an embodiment, the present invention provides another way of ensuring highly accurate position measurement using an interferential position-measuring device.

The interferential position-measuring device according to an embodiment of the present invention is used for determining the position of an object which is disposed to be movable along at least one measurement direction. In the process, a beam emitted by a light source is split into at least two sub-beams, at least one of which impinges on one or more optical functional elements on the object. These sub-beams are subsequently superimposed and interfered at a superposition location. At least one resulting signal beam propagates toward an evaluation unit capable of generating at least one position-dependent measurement signal from the signal beam. At least one switching element for defining a specific sampling point in time is disposed in the signal path downstream of the superimposition location and upstream of a signal-digitizing device.

The switching element may have a plurality of channels, each of which is associated with one signal beam.

In one possible embodiment, the switching element may be disposed between the superposition location and a plurality of optoelectronic detector elements disposed downstream from the superposition location, and adapted for optically modulating the signal beams.

The switching element may take the form of an optical modulator whose transmission characteristic is switchable in a temporally defined manner.

It is also possible for the switching element to be designed as an optical semiconductor amplifier whose amplification characteristic is switchable in a temporally defined manner.

Alternatively, the switching element may also be disposed downstream of a plurality of optoelectronic detector elements and designed as an electrical switching element to electrically modulate the signals generated from the signal beams before the signals are fed to subsequent signal-processing elements.

In a possible variant, the optical functional element takes the form of a measuring standard having a periodic measuring graduation, which is impinged upon by at least two split sub-beams.

Alternatively, the optical functional element may take the form of a reflector mirror which is disposed in a measuring arm and impinged upon by a first sub-beam, while a second sub-beam impinges on a further reflector mirror stationarily disposed in a reference arm.

Preferably, the light source is designed to operate in continuous mode.

An embodiment of the inventive method for operating an interferential position-measuring device is used for determining the position of an object which is disposed to be movable along at least one measurement direction. In the process, a beam emitted by a light source is split into at least two sub-beams, at least one of which impinges on one or more optical functional elements on the object, and which are subsequently superimposed and interfered at a superposition location. At least one resulting signal beam then propagates toward an evaluation unit, which generates at least one position-dependent measurement signal from the signal beam. A specific sampling point in time is defined by at least one switching element disposed in the signal path downstream of the superimposition location and upstream of a signal-digitizing device.

It may be provided that the at least one signal beam is optically modulated by the switching element disposed between the superposition location and a plurality of optoelectronic detector elements disposed downstream from the superposition location.

Alternatively, it may also be provided that the signals generated from the signal beams are electrically modulated by the switching element disposed downstream of a plurality of optoelectronic detector elements before they are fed to subsequent signal-processing elements.

Advantageously, the light source is operated in continuous mode.

It is also possible to switch the switching element on and off in a temporally defined manner by means of a clock signal.

Furthermore, it may be provided that the at least one signal beam is optically modulated by a first switching element disposed between the superposition location and a plurality of optoelectronic detector elements disposed downstream from the superposition location, and the signals generated from the signal beams are electrically modulated by a second switching element disposed downstream of a plurality of optoelectronic detector elements before they are fed to subsequent signal-processing elements.

Thus, in accordance with an embodiment of the present invention, instead of using light sources operated in pulsed mode, modulation is provided in the signal path after the superposition of the interfering sub-beams and prior to signal digitization in order to avoid any possibly resulting sampling jitter. In this way, the signal is pulsed prior to further, sampling-jitter-prone signal processing, such as A/D conversion, to thereby exactly define a specific sampling point in time. Thus, in contrast to the prior art, it is no longer necessary to use high-power light sources operated in pulsed mode, which typically require a relatively high level of technical complexity. It is possible to use significantly less complex light sources, namely high-power light sources operating in continuous mode, such as, for example, suitable CW laser light sources. Thus, it is possible to also use light sources with long coherence lengths, which are required for certain highly accurate measuring principles. In this way, it is possible not only to implement grating-based position-measuring devices having measuring standards as optical functional elements, but in addition also to embody the inventive position-measuring device as an interferometer. In such interferometers, the optical functional element is designed as a movable reflector mirror in a measuring arm, and a further reflector mirror is stationarily disposed in a reference arm. Another advantage that may be mentioned in connection with the embodiment as an interferometer is that because, according to the present invention, switching or pulsing does not take place until the sub-beams have been superimposed, the degree of signal modulation does not change along the measurement path. In the case of pulsing prior to superposition, interference would always occur between two temporally offset pulses. As a result, the degree of modulation would decrease with the difference in length between the measuring arm and the reference arm.

Figure 1:
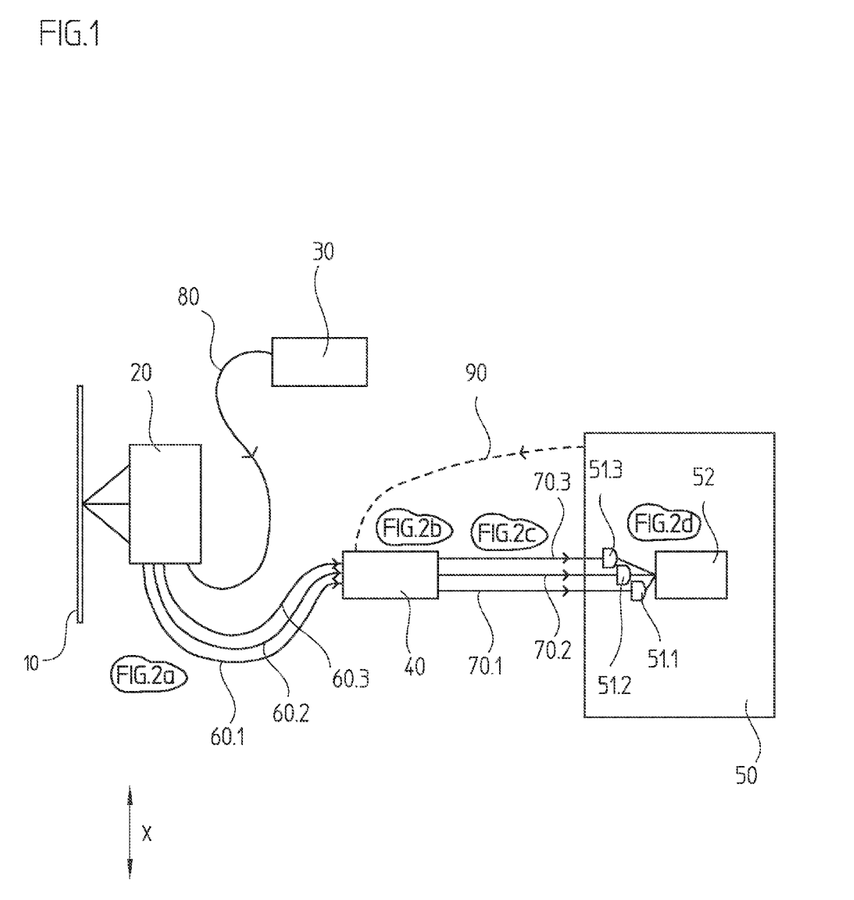
FIG. 1 is a highly schematic view of a first exemplary embodiment of the interferential position-measuring device according to the present invention.

A first exemplary embodiment of the interferential position-measuring device according to the present invention and of the inventive method will be described below with reference to FIGS. 1 and 2a-2d. FIG. 1 illustrates this embodiment in highly schematic form; FIGS. 2a-2d each show schematic signal diagrams illustrating the basic operating principle.

In the present first exemplary embodiment, the interferential position-measuring device according to the present invention takes the form of a grating-based position-measuring device including, inter alia, a functional element 10 in the form of a measuring standard, a scanning unit 20, a light source 30, a switching element 40, as well as an evaluation unit 50.

Functional element 10 is disposed to be movable relative to scanning unit 20 along at least one measurement direction x. In principle, it is irrelevant which component is stationary and which is movable. It is only important that functional element 10 and scanning unit 20 are movable relative to each other. Thus, for example, functional element 10 may be connected to an object that is movable along measurement direction x, such as a relevant machine component, whose position relative to the stationary machine components is to be determined with high accuracy by means of scanning unit 20. The position-dependent measurement signals produced by the interferential position-measuring device according to the present invention are further processed by a higher-level machine controller, for example, for the purpose of accurately positioning the movable machine component.

In the exemplary embodiment shown, the measuring standard of functional element 10 includes a reflection measuring graduation provided on a suitable carrier substrate. The reflection measuring graduation is formed, for example, by graduation regions which are periodically arranged along measuring direction x and have different reflectivities or different phase-shifting effects.

A light source 30 is provided in the form of a laser operated in continuous mode; i.e., in CW mode. Lasers suitable for this include Fabry-Perot lasers, DFB lasers, external cavity lasers and fiber lasers, whose radiation can cover a large wavelength range of from 500 nm up to 2 μm. The beam emitted by light source 30 is delivered to scanning unit 20, for example via an optical fiber 80. Depending on the optical scanning principle employed, scanning unit 20 may contain a wide variety of optical components, such as, for example, gratings, lenses, reflectors, retroreflectors, etc. This variety of optical components, as well as a scanning beam path described by way of example below, are not considered important in an embodiment of the present invention which is in principle independent of a particular optical scanning principle and may be implemented in connection with a wide variety of interferential optical scanning principles and scanning beam paths, respectively.

In the position-measuring device of the present invention, the beam emitted by light source 30 is split into at least two sub-beams, for example by suitable beam splitters, such as, for example, gratings or beam splitter cubes. Depending on the scanning principle chosen, the splitting may occur either already in scanning unit 20 or later on the measuring standard or functional element 10. After one or both of the sub-beams has/have impinged on functional element 10 one or more times, the sub-beams are finally recombined at a superposition location, where they are superimposed and interfered. At least one resulting signal beam then propagates toward evaluation unit 50, which is capable of generating at least one position-dependent measurement signal from the signal beam.

More specifically, in the present exemplary embodiment, it is provided that the beam coming from light source 30 via optical fiber 80 is split into two sub-beams when it strikes the measuring standard the first time, whereupon the two sub-beams are reflected back toward scanning unit 20. There, the sub-beams are retroreflected a first time toward the measuring standard, where they are reflected back again toward scanning unit 20. In scanning unit 20, the sub-beams are retroreflected a second time toward the measuring standard, where the sub-beams are then superimposed and interfered at a superposition location and propagate as a resulting signal beam toward scanning unit 20. In scanning unit 20, there occurs a first splitting into three signal beams having different phase relationships, which reach evaluation unit 50 via optical fibers 60.1-60.3, switching element 40, and optical fibers 70.1-70.3. As for evaluation unit 50, only the optoelectronic detector elements 51.1-51.3 associated with the three phase-shifted signal beams and a transimpedance amplifier 52 are shown in FIG. 1 as further signal-processing elements. These elements are used for generating a plurality of phase-shifted, position-dependent measurement signals, which are then fed to a further evaluation unit for further processing, in which signal corrections and position calculation are then performed. The position data is then made available at the output at a fixed clocked rate via a data bus.

In evaluation unit 50, the light pulses generated with the aid of switching element 40 are initially converted into electrical signals, typically photo-currents, by means of detector elements 51.1-51.3 in the form of photodetectors. In a further step, these signals are amplified by transimpedance amplifier 52 and integrated in a charge amplifier. In a subsequent processing step, the integrated charge is digitized and used for calculating the phase and position at the sampling point in time. The integrated charge is proportional to the gate time of the sampling window and to the amplitude of the optical signal, and therefore, like the intensity signals obtained by conventional sampling, may be used for calculating the phase and position.

The light signals generated by scanning unit 20 in optical fibers 60.1-60.3 are dependent on the position of functional element 10 and are modulated sinusoidally when functional element 10 moves relative to scanning unit 20. The frequency of these sinusoidal signals is proportional to the traversing speed of functional element 10 and in typical applications may be between 0 Hz (at standstill) and about 20 MHz (at a traversing speed of several m/s).

In conventional sampling according to the prior art, these optical sinusoidal signals are initially converted to an electrical current; i.e., a photo-current, by means of a photodetector, such as a semiconductor photodiode or a photomultiplier. Available laser light sources typically have optical output powers of a few milliwatts. Thus, the optical power of the individual output signals of scanning unit 20 is typically in the microwatt range. Therefore, in systems known heretofore, a high degree of amplification is required prior to further processing (e.g. digitization) of the photo-currents. Due to the high signal frequencies occurring, this amplification must have a large bandwidth. Such amplification may be accomplished, for example, using transimpedance amplifiers, which convert the photo-current to a voltage which may subsequently be digitized by an analog-to-digital converter. At the same time, this amplification must be as low-noise as possible, because any noise produced in the process would cause noise in the output phase and position to be calculated. Because of the high demands placed on the amplification of the photo-currents, the corresponding amplifiers are operated at high signal frequencies near the cut-off frequency and, depending on the traversing speed of functional element 10, a substantial portion of the total frequency range of the amplifier is traversed. In this connection, different input frequencies may result in different phase shifts of the signal in the amplifier and in different group delays. Therefore, the propagation delay of the signal from the incoming light signal to the sampling, for example, by means of an analog-to-digital converter, is not constant, but dependent on the traversing speed of functional element 10. At the same time, this propagation delay may vary among the individual signals, for example, due to scattering, and fluctuate, for example, due to thermal drift of components, so that the point in time at which a position is actually detected is not constant.

In contrast, by sampling the optical signals with the aid of switching element 40 in accordance with the present invention, the sampling point in time is defined solely by the switching points in time of switching element 40 and is independent of the input frequency of the light signals and, thus, of the traversing speed of functional element 10. Since the bandwidth of the control of switching element 40 is not subject to the same limitations as the amplification of the low photo-currents, the bandwidth of this control can be selected to be much higher than the bandwidth achievable with sensitive transimpedance amplifiers and, thus, is significantly less sensitive to component variations and drift effects. In this case, the conversion and amplification of the signals no longer affect the sampling point in time. Thus, the approach of the present invention makes it possible to achieve a significantly more accurate and more drift-resistant measurement and sampling, respectively.

Since, in the case of the optical scanning according to an embodiment of the present invention, it is no longer necessary to convert and amplify a sinusoidal input signal having a high frequency, but instead the charge of a pulse is integrated and measured after the optical scanning, the bandwidth of the signal conversion and amplification no longer has to correspond to the maximum input frequency. Rather, it is sufficient that the subsequent electronics have a bandwidth of about three times the sampling frequency, so that between two sampling pulses, the light pulses are nearly completely integrated. Thus, at an exemplary sampling rate of 100 kHz, a bandwidth of about 300 kHz is sufficient, whereas in the methods known heretofore, a bandwidth of more than 20 MHz would be required for this purpose. Because of this, the signal-processing electronics of the device according to the present invention can be made significantly more sensitive and noise-optimized.

Thus, what is essential to the interferential position-measuring device and the method according to the present invention is the placement of switching element 40 (shown only schematically in FIG. 1) in the signal path downstream of the superposition location of the sub-beams and upstream of a subsequent signal-digitizing or A/D conversion device. In this way, it is possible to reliably guarantee a specific sampling point in time at which position sensing takes place. This makes it possible to reliably avoid sampling jitter, which might otherwise arise during subsequent signal processing. Thus, the position sensing point in time is here defined only by synchronous modulation; i.e., by switching the signal beams leaving scanning unit 20 via optical fibers 60.1-60.3 toward evaluation unit 50 on and off in a defined manner. To this end, switching element 40 is controlled via signal line 90 by means of a suitable clock signal from evaluation unit 50.

Besides a single scanning unit, the device according to the present invention may also be adapted to use a plurality of scanning units to scan a plurality of functional elements. Then, the various scanning units and functional elements make it possible to sense object movements along a plurality of measurement directions or movement axes, such as the pose of a stage that is movable in a plurality of spatial degrees of freedom. The signals of the various scanning units may then be fed to an evaluation unit, for example, via various switching elements synchronized by suitable clock signals.

By defining the sampling point in time of various scanning units, for example, via a common switching element or by parallel synchronized control of a plurality of switching elements, the position signal of the various scanning units can be sampled at a fixed and known point in time. Thus, the measurement values of the various axes do not exhibit any temporal offset, and the pose of a stage may be determined with high accuracy in this manner.

When using a single scanning unit to acquire a plurality of phase-shifted measurement signals for the movement along a single measurement direction, these signals are produced synchronously by means of the measures according to the present invention. Otherwise, these signals would also be subject to sampling jitter. Without the inventive switching element, phase signals of different points in time would be arithmetically combined to produce a position signal which, consequently, would not reflect the real and measured position.

Thus, the approach of the present invention has the decisive advantage that the quasi-digital and input-signal-frequency independent control of the switching element can be made more drift-resistant and more accurate than in the case of the signal chain from the photodetector to the A/D converter provided in the prior art.

The basic operating principle of the present invention will now be further described with reference to FIGS. 2a-2d. As can be seen from FIG. 1, the different schematic signal diagrams of FIGS. 2a-2d are associated with the corresponding components in the signal path.

Figure 2A:
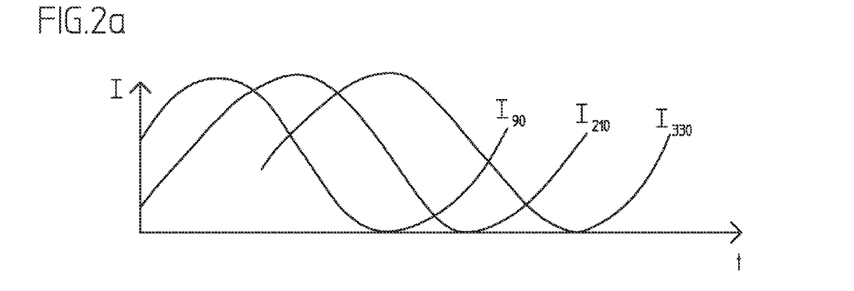
FIGS. 2a-2d are schematic signal diagrams illustrating the operating principle of the interferential position-measuring device according to an embodiment of the present invention.

When, under illumination by a light source 30 operating in continuous mode, optical functional element 10, respectively the measuring standard, moves relative to scanning unit 20, the three periodic position-dependent optical signals $I_{90}$, $I_{210}$, $I_{330}$ shown in FIG. 2a are produced, which are offset in phase by 120° and have a sinusoidal waveform. In FIG. 2a, the intensity of signals $I_{90}$, $I_{210}$, $I_{330}$ is plotted against time. The signals $I_{90}$, $I_{210}$, $I_{330}$ produced are transmitted via optical fibers 60.1-60.3 from scanning unit 20 toward switching element 40.

Figure 2B:
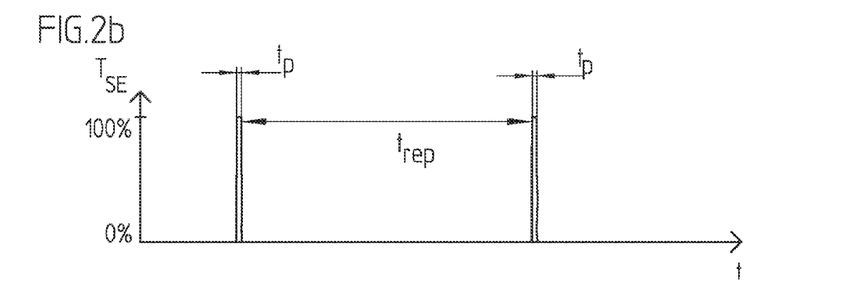

In accordance with the present invention, switching element 40 is now switched on and off in a temporally defined manner, whereby the signal beams; i.e., the respective optical signals $I_{90}$, $I_{210}$, $I_{330}$ in optical fibers 60.1-60.3, are time-modulated in terms of intensity. To this end, for example, the transmission characteristic of the suitably designed switching element 40 is varied in a defined manner with time, as is illustrated in FIG. 2b. In this figure, the transmissivity $T_{SE}$ of switching element 40 is plotted against time. As can be seen, switching element 40 is switched to be transmissive for a period $t_P$ at intervals $t_{rep}$, and to be completely opaque during the period therebetween. Accordingly, transmissivity $T_{SE}$ is switched back and forth between $T_{SE}=100\%$ during a period $t_P$ and a transmissivity $T_{SE}=0\%$ during period $t_{rep}$. In the present exemplary embodiment, switching element 40 has three channels, each associated with one of the three generated signal beams; i.e., with one of signals $I_{90}$, $I_{210}$, $I_{330}$. FIG. 2a shows the typical transmission characteristic in each of the three channels. Thus, after passage through switching element 40, optical signals $I_{90}$, $I_{210}$, $I_{330}$ are present in the form of pulses, the pulse duration of each signal $I_{90}$, $I_{210}$, $I_{330}$ being denoted as $t_P$ hereinafter.

Figure 2C:
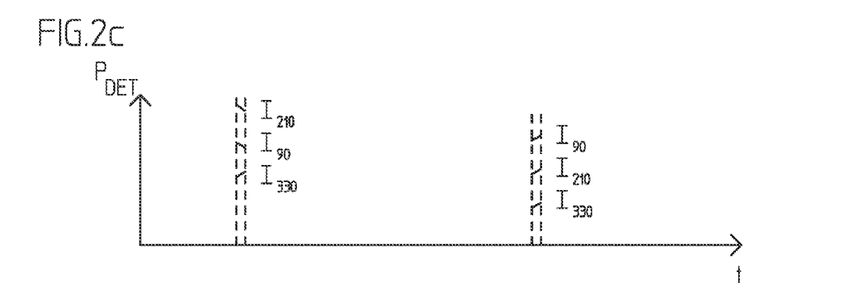
Figure 2D:
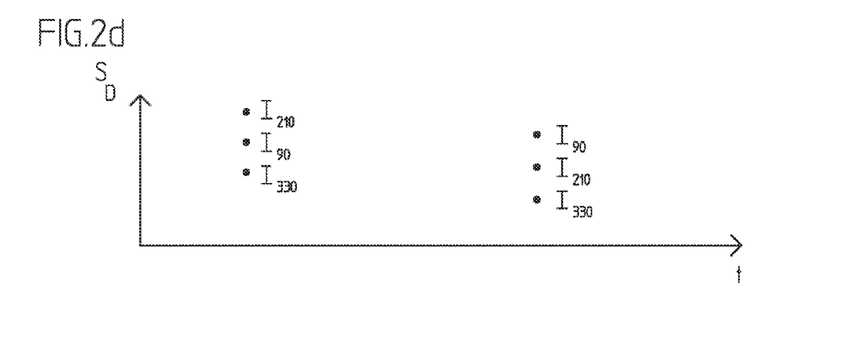

FIG. 2c finally illustrates the variation with time of the different signals $I_{90}$, $I_{210}$, $I_{330}$ after passage through switching element 40; i.e., the variation of the signals $I_{90}$, $I_{210}$, $I_{330}$ in the form in which they strike the downstream optoelectronic detector elements 51.1-51.3 in evaluation unit 50. Via detector elements 51.1-51.3, the signals, which up to this point in time are purely optical, are converted into electrical signals and integrated over the pulse duration $t_P$. As shown in FIG. 2d, one value is obtained for each of signals $I_{90}$, $I_{210}$, $I_{330}$, each value being subsequently digitized; i.e., A/D converted, and stored for further signal processing.

In the following, suitable switching elements such as may be employed in the first exemplary embodiment for modulating the signal beams in the signal path in accordance with the present invention will be described with reference to FIGS. 3 and 4. The switching elements proposed are suitable, in particular, for optically modulating the signal beams between the superposition location and the plurality of downstream detector elements.

As already mentioned above, the corresponding switching elements are designed to allow a plurality of optical channels to be switched on and off simultaneously, each of these channels being associated with one of the different signal beams. This makes it possible to circumvent the problem that the switching elements are subject to jitter or drift with respect to one another in the time domain, which would ultimately result in a sampling jitter, and as such in a measurement error. A drift of the switching elements with respect to one another would result, for example, in that the sampling points in time of the signals in the signals paths of a plurality of scanning units would no longer be identical. In the case of high traversing speeds, this, in turn, leads to the problem that positions are arithmetically combined at different times; i.e., that, ultimately, different positions are arithmetically combined, for example, to calculate the pose of a moving stage. This results in the inaccuracies mentioned at the outset, which should be avoided to the extent possible.

The same applies also for the phase-shifted signals of a single scanning unit. If the sampling points in time of these signals drifted with respect to one another, then the position would be calculated from phase-shifted signals which would originate from different positions or times and, thus, would not reflect the real position of the scanning unit and the functional element.

Figure 3:
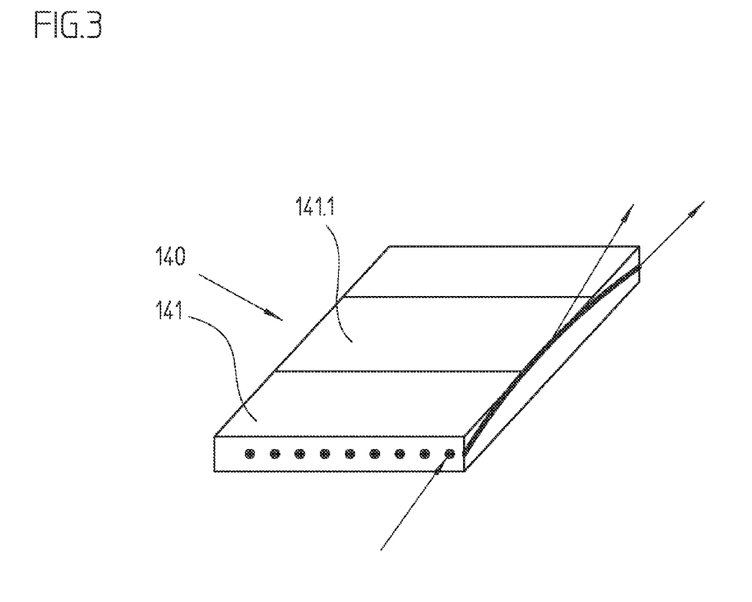
FIG. 3 is a schematic view of a possible embodiment of a suitable switching element.

FIG. 3 shows, in highly schematic form, a first exemplary embodiment of a suitable multi-channel switching element 140 in the form of an optical modulator whose transmission characteristic is switchable in a temporally defined manner. This switching element 140 includes substantially a planar multimode waveguide 141, into which the signal beam coming from the scanning unit is coupled at a defined angle to the end face of the modulator. A partial region 141.1 of the upper side of multimode waveguide 141, where the incident signal beam undergoes a single total reflection, is coated with a material having an electrically alterable refractive index. Thus, by applying a voltage to this partial region 141.1, it is possible to enable or prevent total reflection in a defined manner; i.e., to thereby obtain for switching element 140 a transmission characteristic which is switchable in a temporally defined manner. Alternatively, the material used in partial region 141.1 on multimode waveguide 141 may be one whose reflectivity is electrically switchable in a defined manner. Thus, the plurality of signal beams coming from the scanning unit can be directed via the plurality of indicated channels of this switching element 140, which includes, as it were, a "switchable mirror." This allows the signal beams to be optically modulated or pulsed before the optical signals are converted into electrical signals or photo-currents by the downstream detector elements.

The two arrows shown in FIG. 3 at the output end represent the light paths obtained in the ON and OFF states. When the optically active material of switching element 140 is in the "OFF" state, the light passes straight through switching element 140 and exits through the upper surface thereof. When the material is in the "ON" state, the light is deflected or reflected and exits through the second end face and is then passed on, for example, in a multimode waveguide again.

In order to increase the modulation depth of a switching element designed in this way, it may further be provided that the sub-beams passing therethrough are reflected several times at the interfaces in the multimode waveguide. With regard to such switching elements, reference may be made, for example, to the textbook entitled "Laser Beam Shaping Applications," F. M. Dickey et al.; Marcel Dekker, Inc., 2005; p. 95; FIG. 2.24.

Figure 4:
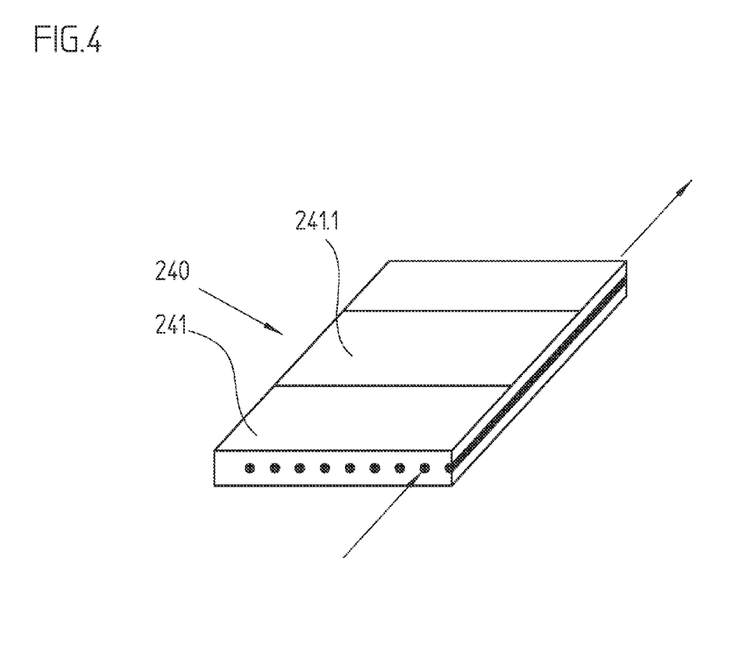
FIG. 4 is a schematic view of another possible embodiment of a suitable switching element.

FIG. 4 shows, in highly schematic form, a second exemplary embodiment of a suitable multi-channel switching element 240 in the form of an optical modulator whose amplification characteristic is switchable in a temporally defined manner. Here, the modulation; i.e., the defined switching on and off of the signal beams coming from the scanning unit is accomplished with the aid of an optical semiconductor amplifier through which the signal beams pass in a plurality of channels. To this end, contacting regions 241.1 are formed on the upper and lower sides of a semiconductor substrate 241, which are designed, for example, as buried heterostructures. Via the contact regions, an electrical voltage can be applied to semiconductor substrate 241, and the semiconductor material can be switched to be absorbent or back and forth with an amplification factor greater than one. By using suitable semiconductor materials, very high switching frequencies and, thus, very short pulse durations can be achieved for the optical modulation of the signal beams in switching elements 240 designed in this manner.

In order to design a multi-channel modulator for a plurality of signal beams in such an embodiment, a plurality of such amplifier structures may be produced side-by-side on a semiconductor substrate and provided with a common contacting region. In this way, all amplifiers are operated isochronously, and the jitter of the different channels with respect to one another can be minimized.

If the switching element is designed as an optical modulator, for example, according to the two aforedescribed variants, then, depending on the specific application, this switching element may either be integrated directly into the interferential position-measuring device or disposed and controlled externally in the evaluation unit.

In particular in the latter case; i.e., when the switching element is integrated into the evaluation unit, it is also possible to use other optical modulators as switching elements, such as acousto-optical or electro-optical modulators, Pockels cells, or electro-absorptive modulators, through which the generated signal beams of the interferential position-measuring device are in each case jointly passed.

Figure 5:
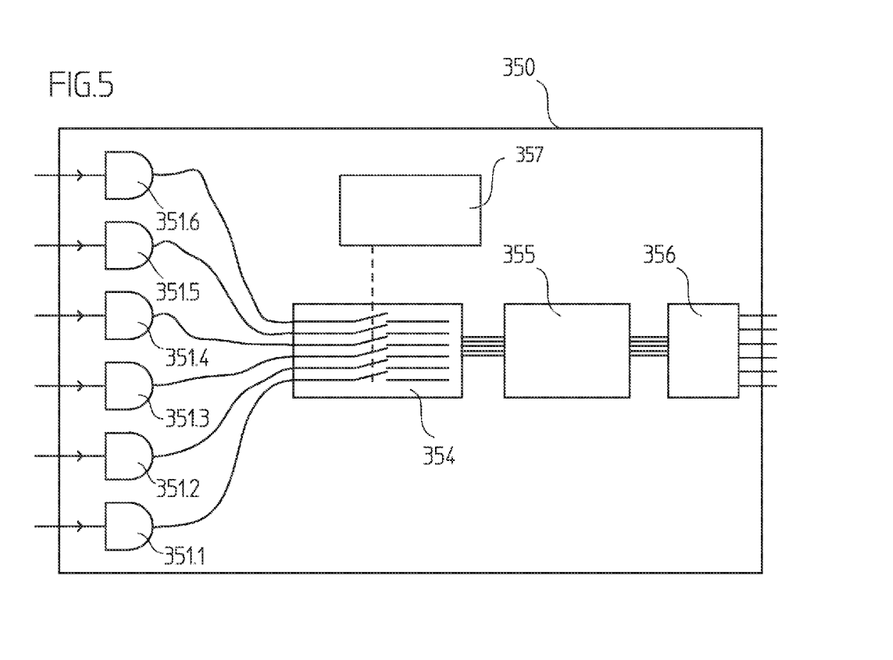
FIG. 5 is a highly schematic partial view of a second exemplary embodiment of the interferential position-measuring device according to the present invention.

A second exemplary embodiment of the interferential position-measuring device according to the present invention will now be described with reference to FIG. 5, which is a highly schematic view showing a portion of this variant, namely only the evaluation unit 350 provided therein. In the following description of this exemplary embodiment, substantially only the relevant differences from the first exemplary embodiment will be discussed.

In this exemplary embodiment, the signal beams may be generated in the same way as in the first exemplary embodiment described above. However, in contrast thereto, the switching element for defining the specific sampling point in time is not disposed in the optical signal path between the superposition location of the interfering sub-beams and the downstream optoelectronic detector elements. Rather, in the present case, switching element 354 is designed as an electrical switching element disposed downstream of optoelectronic detector elements 351.1-351.6. Furthermore, in the illustrated case, a total of six detector elements 351.1-351.6 are shown, which are associated with two separate scanning units and capable of sensing movements along two axes. Thus, modulation is not performed on the signal beams or optical signals incident on optoelectronic detector elements 351.1-351.6, but on the electrical signals produced therefrom by optoelectronic detector elements 351.1-351.6 before these are passed on to further signal-processing elements, such as, for example, a charge amplifier 355 and a signal processing unit 356.

Thus, as an alternative to the above-described optical modulation of the signal beams, in this exemplary embodiment the interferential position-measuring device according to the present invention, the signal-processing electronics are opened by suitable electric switches in switching element 354 only for a time window corresponding to the light pulse, and the signal is acquired. During the remaining time, the downstream signal-processing electronics are, as it were, "blind" for the applied electrical signals because of the lack of open switches in switching element 354. Such a method for generating pulses as desired in the signal path after the superposition of the interfering sub-beams may also be referred to as "gated counting."

As in the first outlined approach, here too, the sinusoidal input signal is sampled, followed by signal integration, so that the electronics following the switching element no longer affect the determination of the sampling point in time and no longer needs to have the bandwidth of the high signal frequencies.

In general, however, such a procedure places increased demands on the temporal stability of the switching elements with respect to one another. Here, the individual electrical channels of switching element 354 cannot be served by one common modulator, but in each case have to be switched separately. Due to this, the demands on the temporal stability of the individual switches of switching element 354 with respect to one another and to the reference are very high.

Figure 6:
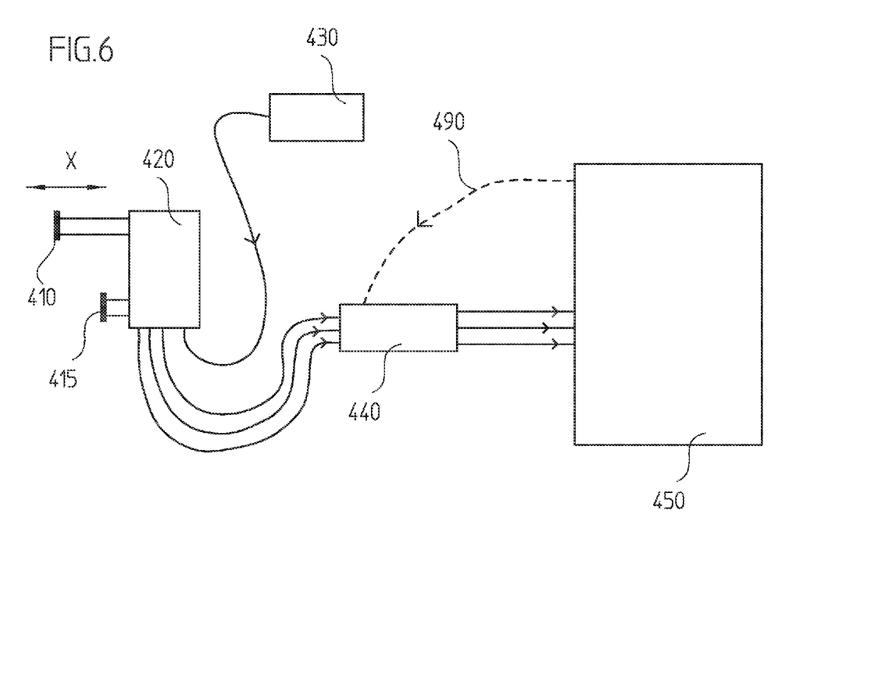
FIG. 6 is a highly schematic view of a third exemplary embodiment of the interferential position-measuring device according to the present invention.

Finally, FIG. 6 shows a third exemplary embodiment of the inventive interferential position-measuring device in a highly schematic view analogous to the view of the exemplary embodiment in FIG. 1. This variant is not designed as a grating-based position-measuring device, but as an interferometer. Accordingly, in contrast to the first exemplary embodiment, the optical functional element 410 disposed on an object that is movable along measurement direction x takes the form of a reflector mirror. The reflector mirror is impinged upon one or more times by one of the two sub-beams generated in scanning unit 420. Thus, this beam path provides an interferometer measuring arm, while a second sub-beam resulting after the splitting impinges on a stationary further reflector mirror 415 in an interferometer reference arm. Apart from that, the design of switching element 440, which receives the synchronization signal via signal line 490, and of evaluation unit 450 corresponds basically to the first exemplary embodiment.

As already mentioned at the outset, the switching element provided in the signal path after the superposition of the interfering sub-beams eliminates the need to use a light source operated in pulsed mode in order to avoid any possibly resulting sampling jitter. Thus, if the inventive interferential position-measuring device is designed as an interferometer, it is possible to choose an optimized light source 430 with a sufficiently long coherence length, such as, for example, a He—Ne laser, an Nd-YAG laser, or a fiber laser.

In addition to the exemplary embodiments specifically described herein, other embodiments are, of course, possible within the scope of the present invention.

For example, combinations of the first and second exemplary embodiments described may also be implemented; i.e., combinations of the variants with optical and electrical modulation in the signal path downstream of the superposition location.

In this case, for example, an optical pulse of long duration may be generated upstream of the detector elements by means of a switching element in the form of an optical modulator, and a suitably short pulse may subsequently be cut from the long-duration optical pulse by gated counting; i.e., by a suitable switching element for electric modulation. By distributing the modulation among two processes, lower demands can be placed on each process in terms of the required modulation depth.

In order to increase the modulation depth, the following approach may also be implemented within the scope of the present invention. The precise shaping of the pulses can be accomplished with the aid of the optical multi-channel modulator. In addition, "gated counting" is performed in the evaluation unit, whereby the subsequent signal-processing electronics are switched to be blind for the period between the pulses. The advantage of this approach is that the demands on the allowable jitter of the signal-processing electronics are significantly lower in this case because the definition of the sampling point in time is performed optically, etc.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. An interferential position-measuring device for determining a position of an object which is disposed to be movable along at least one measurement direction, the device comprising:

a light source configured to emit a beam which is split into at least two sub-beams, at least one of the sub-beams impinging on one or more optical functional elements on the object, the sub-beams subsequently being superimposed and interfered at a superposition location and at least one resulting signal beam propagating toward an evaluation unit configured to generate at least one position-dependent measurement signal from the at least one resulting signal beam; and at least one switching element disposed in the signal path downstream of the superposition location and upstream of a signal-digitizing device, the at least one switching element being configured to define a specific point in time at which sampling occurs.

2. The interferential position-measuring device as recited in claim 1, wherein the at least one switching element has a plurality of channels, each of the channels being associated with a respective one of the at least one resulting signal beam.

3. The interferential position-measuring device as recited in claim 1, wherein the at least one switching element is disposed between the superposition location and a plurality of downstream optoelectronic detector elements and is configured to optically modulate the signal beams.

4. The interferential position-measuring device as recited in claim 3, wherein the at least one switching element includes an optical modulator whose transmission characteristic is switchable in a temporally defined manner.

5. The interferential position-measuring device as recited in claim 3, wherein the at least one switching element includes an optical semiconductor amplifier whose amplification characteristic is switchable in a temporally defined manner.

6. The interferential position-measuring device as recited in claim 1, wherein the at least one switching element is disposed downstream of a plurality of optoelectronic detector elements and is configured as an electrical switching element that electrically modulates the at least one position-dependent measurement signal generated from the at least one resulting signal beam before the at least one position-dependent measurement is fed to subsequent signal-processing elements.

7. The interferential position-measuring device as recited in claim 1, wherein the optical functional element takes the form of a measuring standard having a periodic measuring graduation which is impinged upon by at least two split sub-beams.

8. The interferential position-measuring device as recited in claim 1, wherein the one or more optical functional elements include a reflector mirror which is disposed at a measuring arm and impinged upon by a first one of the sub-beams, while a second one of the sub-beams impinges on a further reflector mirror stationarily disposed at a reference arm.

9. The interferential position-measuring device as recited in claim 1, wherein the light source is configured to operate in a continuous mode.

10. The interferential position-measuring device as recited in claim 1, wherein the specific point in time at which the sampling occurs is defined solely by a point in time of switching of the at least one switching element.

11. The interferential position-measuring device as recited in claim 1, wherein the specific point in time at which the sampling occurs is defined independent of an input frequency of the light source.

12. A method for operating an interferential position-measuring device for determining a position of an object which is disposed to be movable along at least one measurement direction, the method comprising:
   emitting, by a light source, a beam which is split into at least two sub-beams, at least one of the sub-beams impinging on one or more optical functional elements on the object, the sub-beams subsequently being superimposed and interfered at a superposition location and at least one resulting signal beam propagating toward an evaluation unit configured to generate at least one position-dependent measurement signal from the at least one resulting signal beam; and
   defining, by at least one switching element disposed in the signal path downstream of the superimposition location and upstream of a signal-digitizing device, a specific point in time at which sampling occurs.

13. The method as recited in claim 12, wherein the at least one resulting signal beam is optically modulated by the at least one switching element which is disposed between the superposition location and a plurality of optoelectronic detector elements disposed downstream from the superposition location.

14. The method as recited in claim 12, wherein the at least one position-dependent measurement signal generated from the at least one resulting signal beam is electrically modulated by the at least one switching element, which is disposed downstream of a plurality of optoelectronic detector elements, before the at least one position-dependent measurement signal is fed to subsequent signal-processing elements.

15. The method as recited in claim 12, wherein the light source is operated in a continuous mode.

16. The method as recited in claim 12, wherein the at least one switching element is switched on and off in a temporally defined manner by means of a clock signal.

17. The method as recited in claim 12, wherein the at least one switching element includes a first switching element disposed between the superposition location and a plurality of optoelectronic detector elements and a second switching element disposed downstream of a plurality of optoelectronic detector elements disposed downstream from the superposition location, the at least one resulting signal beam being optically modulated by the first switching element, and the at least one position-dependent measurement signal generated from the at least one resulting signal beam being electrically modulated by the second switching element before the at least one position-dependent measurement signal is fed to subsequent signal-processing elements.

18. The method as recited in claim 12, wherein the specific point in time at which the sampling occurs is defined solely by a switching point in time of the at least one switching element.

19. The method as recited in claim 12, wherein the specific point in time at which the sampling occurs is defined independent of an input frequency of the light source.

* * * * *